No. 862,132. PATENTED AUG. 6, 1907.
J. BUCKLEY.
COOKING UTENSIL.
APPLICATION FILED FEB. 19, 1907.
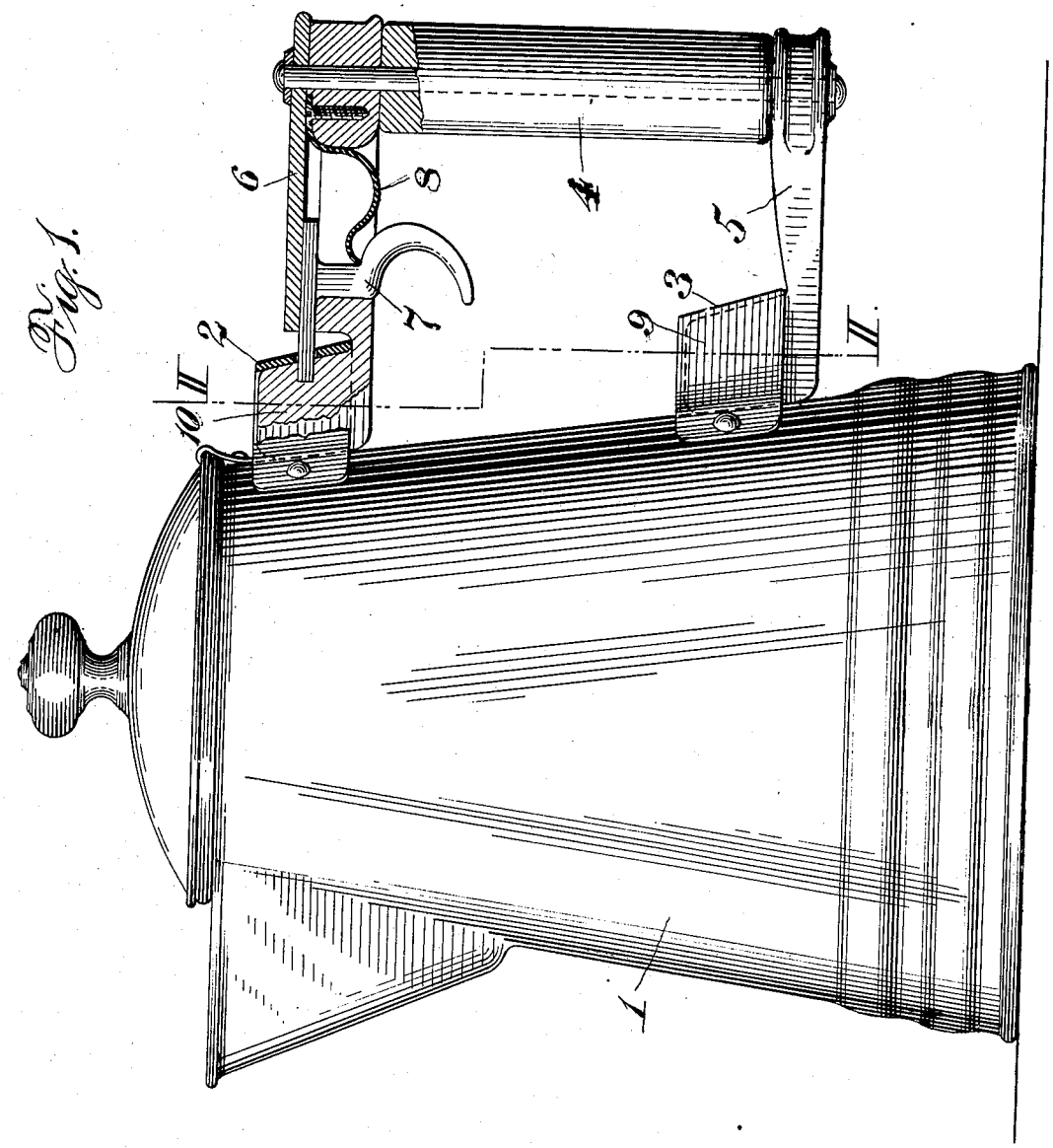
WITNESSES
INVENTOR
James Buckley

UNITED STATES PATENT OFFICE.

JAMES BUCKLEY, OF PITTSBURG, PENNSYLVANIA.

COOKING UTENSIL.

No. 862,132.  Specification of Letters Patent.  Patented Aug. 6, 1907.

Application filed February 19, 1907. Serial No. 358,192.

*To all whom it may concern:*

Be it known that I, JAMES BUCKLEY, a citizen of the United States, residing at Pittsburg, in the county of Allegheny and State of Pennsylvania, have invented certain new and useful Improvements in Cooking Utensils, of which the following is a specification.

My invention relates to cooking utensils, and particularly to those which have to be handled while hot, such as coffee pots, and in which it is desirable to prevent the handle from becoming too hot to handle. The invention has for its objects; to provide a receptacle of this nature with a removable handle; to provide a removable handle which may be very easily and conveniently engaged with the receptacle and which will at the same very securely and tightly engage the receptacle; to provide a removable handle in which the weight of the receptacle has no tendency to disengage the handle; to provide a handle having a securing catch easily operable from the hand engaging the handle, and in which such catch is not depended upon to support the weight of the receptacle; and, finally to provide a detachable handle with a catch in which the accidental disengagement of the catch will not allow the receptacle to fall. These and other advantages are secured by my invention, one embodiment is illustrated in the accompanying drawings, in which Figure 1 is a side elevation of a coffee pot, provided with my detachable handle, the handle being shown partly in section at its upper portion, in order to disclose more clearly the catch construction, and Figure 2 is a section on the line II—II of Figure 1.

Referring to the drawings, 1 is the coffee pot, which may be of any improved construction, 2 is a loop secured to the coffee pot at its upper portion, 3 is a second loop secured adjacent the bottom of the coffee pot, 4 is the hand engaging portion of the handle provided with the horizontal portions 5 and 6, 7 is a reciprocable catch for engaging the upper loop 2, and 8 is a spring for normally holding the catch 7 in its forward position. The forward end of the horizontal members 5 and 6 are provided with upward extending projections, 9 and 10 for engaging the loops, 3 and 2. In order that the projections may securely engage the loops, the loops are provided with upwardly converging walls and the projections 9 and 10 are beveled, as clearly indicated in Figures 1 and 2, whereby a wedging contact between the projections and loops is secured when the handle is placed in position. This arrangement provides for a very rigid connection between the handle and the receptacle, and there is no lost motion between the parts. In order that the handle may remain in place when desired, the catch 7 is provided, which catch as shown is normally held forward through a slot in the loop 2 and in engagement with a recess in the projection 10 by means of the spring 8. It will be noted that the trigger of this catch is located near the upper part of the handle so that such trigger may be very easily operated from the index finger of the hand when the hand is in engagement with the part 4. It will be seen that none of the weight of the receptacle is borne by the catch 7 and that by reason of the projections 9 and 10 engaging the loops from the under side, there will be no danger of detaching the handle from the receptacle while such receptacle is being carried even if the catch should be accidentally retracted. This arrangement obviates all danger of accident and renders the device much more durable than a form of device in which the catch directly supports the article. It will be further seen that the inclination of the wall of the loop 2 performs the function of guiding the catch to its recess in the wall after the lower end of the loop has been passed. Other advantages of the construction will be apparent to those skilled in the art.

Having thus described my invention and illustrated its use, what I claim as new and desire to secure by Letters Patent, is the following:

1. In combination with a receptacle having a pair of engaging loops, the upper one of which is recessed, of a detachable handle comprising a vertical hand engaging portion and of horizontal members at either end thereof, each provided with an upwardly extending projection for engaging one of the said loops, and a reciprocable catch on the upper horizontal member for engaging the recess in the upper loop for locking the handle to the loop.

2. In combination with a receptacle having a pair of engaging loops, of a detachable handle comprising a vertical hand engaging portion and a horizontal member at either end thereof, each provided with an upwardly extending projection for engaging one of the said loops, and a spring catch provided with an operating trigger adjacent the lower side of the upper horizontal member and the upper end of the hand engaging portion for securing one of the projections to a loop.

3. In combination with a receptacle having a pair of loops, one of which has upwardly converging walls, of a detachable handle comprising a vertical hand engaging portion, and a horizontal member at either end thereof, each provided with an upwardly extending projection for engaging one of the said loops, the projection for engaging the loop with converging walls being beveled to fit such loop, and a catch for holding the projections in the loops provided with an operating trigger adjacent the lower side of the upper horizontal member.

In testimony whereof I have hereunto signed my name in the presence of the two subscribed witnesses.

JAMES BUCKLEY.

Witnesses:
 F. E. GAITHER,
 ARCHWORTH MARTIN.